United States Patent [19]

Payne et al.

[11] Patent Number: 5,260,823
[45] Date of Patent: Nov. 9, 1993

[54] ERBIUM-DOPED FIBRE AMPLIFIER WITH SHAPED SPECTRAL GAIN

[75] Inventors: David N. Payne; Richard I. Laming; Paul R. Morkel, all of Southampton, Great Britain; Masao Tachibana, Matsudo, Japan

[73] Assignee: University of Southampton, Southampton, England

[21] Appl. No.: 10,478

[22] Filed: Jan. 28, 1993

Related U.S. Application Data

[63] Continuation of Ser. No. 703,264, May 21, 1991, abandoned.

[30] Foreign Application Priority Data

May 21, 1990 [GB] United Kingdom ............... 9011330

[51] Int. Cl.⁵ .......................... H01S 3/06; G02B 6/26
[52] U.S. Cl. ....................................... 359/341; 372/6; 372/23
[58] Field of Search ............... 359/341; 385/1, 5; 372/6, 23

[56] References Cited

U.S. PATENT DOCUMENTS

| | | | |
|---|---|---|---|
| 3,988,697 | 10/1976 | Cooley . | |
| 4,143,332 | 3/1979 | Michan et al. | 330/4.3 |
| 4,551,684 | 11/1985 | Bernhardt | 330/4.3 |
| 4,794,346 | 12/1988 | Miller | 330/4.3 |
| 4,938,556 | 7/1990 | Digannett et al. | 330/4.3 |
| 4,947,134 | 8/1990 | Olsson | 330/4.3 |
| 4,955,025 | 9/1990 | Mears et al. | 372/6 |
| 5,067,789 | 11/1991 | Hall et al. | 385/27 |

FOREIGN PATENT DOCUMENTS

| | | |
|---|---|---|
| 0260654 | 3/1988 | European Pat. Off. . |
| 0426222 | 5/1991 | European Pat. Off. . |
| 1308384 | 2/1973 | United Kingdom . |
| 1447117 | 8/1976 | United Kingdom . |
| 2189900 | 11/1987 | United Kingdom . |
| 8909506 | 10/1989 | World Int. Prop. O. ............ 372/6 |

OTHER PUBLICATIONS

Shimada, S.; IEEE Transactions on Parallel and Distributed Systems, May 1, 1990, #2, N.Y., USA, p. 75.
Atkins et al.; "High Gain Broad Spectral Bandwidth Erbium Doped Fibre Amplifier . . .", Electron. Lett., vol. 25, #14, pp. 910-911, Jul. 6, 1989, abst. enclosed herewith.
All-fibre components using periodic coupling; IEEE Proceedings, vol. 132, No. 5, Oct. 1985.
Optical Fiber Communication Conference 1990 Technical Digest Series, vol. 1, Jan. 22, 1990, p. 26.
Electronics Letters, vol. 26, No. 10, May 10, 1990, Stevenage GB, pp. 661-662.
Electronics Letters, vol. 25, No. 14, Jul. 6, 1989, Stevenage GB, pp. 910-911.
Electronics Letters, vol. 23, No. 19, Sep. 10, 1987, pp. 1026-1028.
Performance of an Erbium-Doped Fiber Amplifier in a 16-Channel Coherent Broadcast Network Experiment-Cleo Paper PD-22.

Primary Examiner—Nelson Moskowitz
Attorney, Agent, or Firm—Brooks Haidt Haffner & Delahunty

[57] ABSTRACT

The spectral-gain characteristics of an erbium-doped fibre amplifier have been tailored by incorporating a gain-shaping-filter within the amplifier. The filter is chosen to modify the natural gain spectrum of the amplifier so as to suppress the gain peak and thus flatten the overall spectral-gain profile. Because the amplifier is distributed, it is possible to insert one or more filters along the length of the fibre. It is shown that there are considerable advantages to locating the filter within the length of the amplifier, rather than at the end, which is the more obvious choice. Advantages are that the amplifier pump efficiency is almost unaffected and the output saturation power is similar to that of the unshaped amplifier. In addition, the flat spectral gain provides an amplifier ideally-suited for use at a number of signal wavelengths, as required for wavelength-division multiplexing (WDM). The invention therefore comprises both the concept of filtering to shape the gain response of the amplifier and the recognition that this can be achieved without penalty by careful location of one or more filters along the length of the amplifier.

10 Claims, 4 Drawing Sheets

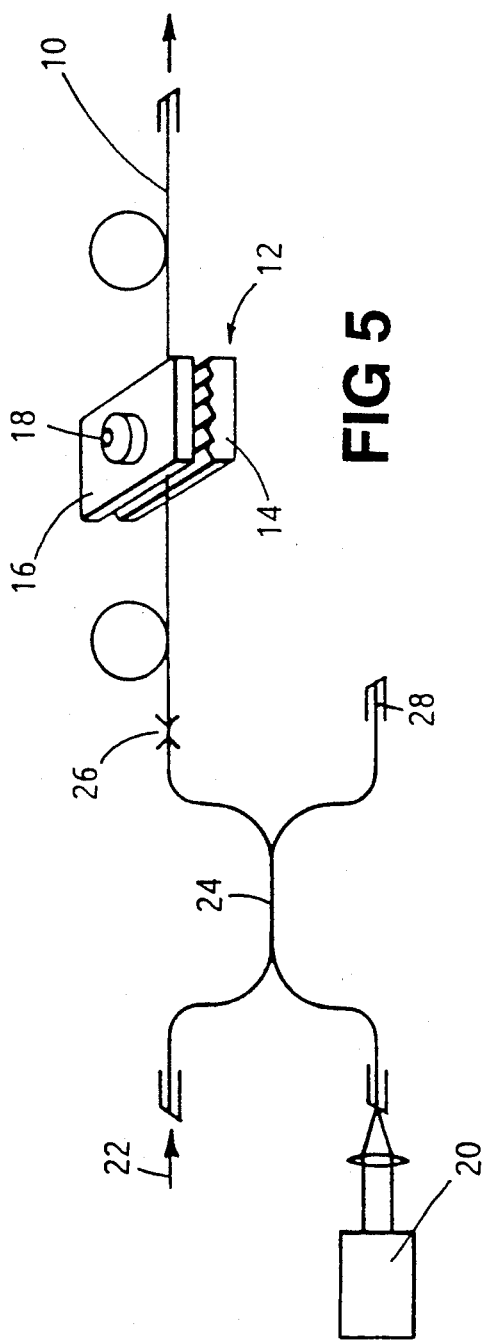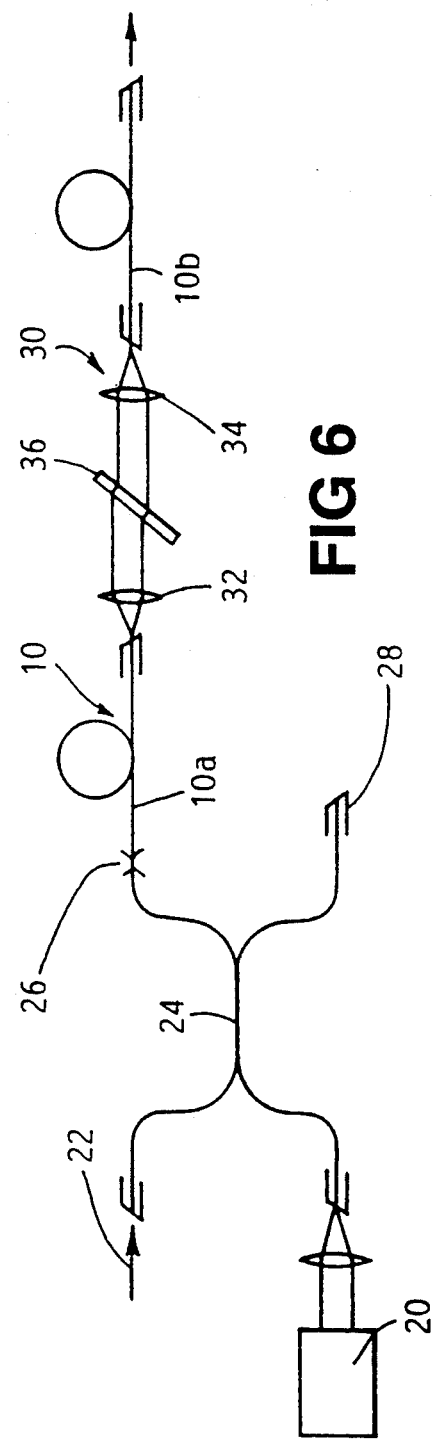

ERBIUM-DOPED FIBRE AMPLIFIER WITH SHAPED SPECTRAL GAIN

This application is a continuation of application Ser. No. 07/703,264, filed May 21, 1991, now abandoned.

BACKGROUND OF THE INVENTION

Rare-earth-doped optical fibre amplifiers, particularly the erbium-doped fibre, have recently attracted very considerable attention in the field of optical fibre communications. See, for example, "Low noise erbium-doped fibre amplifier operating at 1.54 μm", Electronics Letters, Vol. 23, No. 19, p. 1026, 1987 and United Kingdom patent application 2180392. The erbium-doped fibre amplifier (EDFA) conveniently operates in the preferred telecommunications spectral-window located at a wavelength of 1.55 μm. In addition, it has been shown to have high polarisation-insensitive gain (greater than 30 dB), low crosstalk between signals at different wavelengths, good saturation output power (>1 mW) and a noise figure close to the fundamental quantum limit (approximately 3 dB). The excellent noise characteristics potentially allow hundreds of amplifiers to be incorporated along the length of a fibre telecommunication link, which could then span more than 10,000 km. Compared to the alternative of a transmission link with electronic repeaters, an all optical link has the merit that it is transparent to the transmission-code format and bit-rate. It can thus be uprated by changing only the transmitter and receiver, and not the repeaters.

Despite its generally-excellent characteristics, the erbium-doped-fibre amplifier has one major disadvantage, namely its spectral linewidth. The 1.55 μm telecommunications window is approximately 20 nm wide and an ideal amplifier would have a flat spectral-gain across the full window. Although the broad fluorescence linewidth of ions in glass provides wideband amplification, their spectral-gain characteristics are often irregular. For example, the fluorescence band of erbium-doped fibre amplifiers (EDFA) is due to the radiative transition between the $^4I_{13/2}$ to $^4I_{15/2}$ energy levels. Both of these levels are broadened and Stark-split to produce a manifold of contributing levels. Transitions between the $^4I_{13/2}$ manifold and the $^4I_{15/2}$ manifold are not equally likely and, in particular, the transition between the two levels corresponding to the peak gain wavelength has the highest probability. This wavelength varies from 1530 nm to 1535 nm, depending on the host glass material. It is therefore well-known that the spectral gain of an EDFA has a peak response as shown in FIG. 1. It can be seen that because of the irregular shape of the spectral gain, the amplifier has a 3 dB gain-bandwidth of only 4.5 nm.

If it is intended to use the amplifier in a telecommunications system which employs a single signal-wavelength corresponding to the peak gain of the erbium amplifier (1535 nm in the case of a germanosilicate host glass), the narrow spectral gain is no disadvantage and may indeed be an advantage. However, if the telecommunications link is required to operate at a number of optical wavelengths and to exploit fully the available low-loss window offered by current telecommunications fibres, the large variation in gain across the spectrum can cause problems. Referring to FIG. 1 (plotted for an alumino-silicate host glass), it is clear that operating between wavelengths of 1540 nm and 1560 nm offers a broad gain-plateau with a gain reduced by some 8 dB relative to that obtainable at the peak. It is perfectly possible to operate in this reduced-gain plateau, see R. Welter, R. I. Laming, R. S. Vodhanel, W. B. Sessa, M. W. Maeda and R. E. Wagner, "Performance of an erbium-doped fibre amplifier in a 16-channel coherent broadcast network experiment" Proc. CLEO, Paper PD22, Baltimore 1989. However, the presence of an adjacent high-gain region at 1531 nm presents a number of disadvantages, as follows:

1. Laser Oscillation—A high-gain optical amplifier tends to oscillate owing to the existence of feedback from unavoidable reflections and backscatter from the fibre transmission link. Typically, the gain should be limited to around 30 dB in practical applications. Thus, in an amplifier having a peaked response, the maximum gain at the peak must be limited to 30 dB to avoid oscillation, thus giving a gain elsewhere in the spectrum of little over 20 dB.

2. Poor Pumping Efficiency—In a high-gain optical amplifier operating in the small-signal regime, the pump power required to achieve a given gain is dominated by the build up of unwanted amplified-spontaneous-emission (ASE). Spontaneous emission occurs throughout the length of the amplifier but, in particular, only that which originates at the input of the amplifier experiences the full gain through the amplifier. Thus spontaneous emission when subject to a high gain contributes a substantial light level at the amplifier output and can saturate the amplifier output section. Under these ASE-induced saturation conditions, the pump efficiency (i.e. gain/pump power) rapidly decreases and much of the available pump power is converted to ASE at the output of the amplifier, rather than contributing to the gain of the signal. The amount of ASE generated is very nearly proportional to the amplifier gain. Thus the situation is worsened if a high-gain spectral region exists adjacent to that in which it is wished to operate. Taking the example of the gain spectrum shown in FIG. 1, to obtain a 24 dB gain at 1550 nm we cannot avoid having a gain of 32 dB at 1531 nm and must accept the large value of ASE at this wavelength. Thus a substantial amount of the pump power is wasted in supplying ASE power at the gain peak of 1531 nm and this leads to poor pump efficiency. Put another way, to obtain a 24 dB amplifier, we must pump at a rate appropriate to a 32 dB amplifier.

3. Increased Spontaneous-Spontaneous Beat Noise—Apart from reduced pump efficiency, the presence of a large level of ASE at an adjacent wavelength to the signal will contribute a higher level of spontaneous-spontaneous beat noise. This will degrade the amplifier noise figure, particularly under small-signal input conditions.

4. Saturation Problems—For wavelength-division multiplexed signals, difficulties will be experienced in using an amplifier with widely-differing gain for each of the different signal wavelength-channels. A danger exists of the high-gain channel at 1531 nm saturating the amplifier and thus reducing the gain for all the other channels. Saturation can also lead to increased inter-channel crosstalk.

All of the above problems would be alleviated if the amplifier had a perfectly-flat spectral gain. The local environment for the erbium ion has a considerable effect on its gain spectrum and it is well known that an alumino-silicate host glass provides a broader gain spectrum. Previous work has further smoothed this spectrum by use of a pump wavelength of 1.48 μm and careful choice of pump power, C. A. Atkins, J. F. Massicott, J. R. Armitage, R. Wyatt, B. J. Ainslie and S. P. Craig-Ryan, "High-gain broad spectral bandwidth erbium-doped fibre amplifier pumped near 1.5 μm", Electronics Letters, Vol. 25, pp. 910-911, 1989. However, this was achieved at the expense of a lower value of population inversion, reduced pump efficiency and a higher noise figure.

SUMMARY OF THE INVENTION

The invention provides an optical amplifier compromising a length of optical waveguide means. Disposed at at least one point along its length intermediate the ends of the optical waveguide means is an optical band-rejection filter, the rejection-band wavelength of which is substantially matched to the peak wavelength of the gain spectrum of the waveguide means. Preferably, the band-rejection filter comprises a portion of the waveguide means urged into contact with a grating such as to cause periodic perturbation thereof. Alternatively, the band-rejection filter may be a dielectric interference filter.

In a preferred embodiment, the waveguide means is a rare-earth doped optical fibre or planar waveguide.

Thus, we propose a form of spectral gain-shaping accomplished by incorporating an optical filter at some position along the length of the amplifier. It can be shown that a relatively flat, wide spectral-gain can be achieved by this means and the performance achieved contrasted with that obtained by placing a filter at the output of the amplifier. This latter approach does not alleviate the disadvantages as outlined at 2 and 4 above.

BRIEF DESCRIPTION OF THE DRAWINGS

Embodiments of an erbium-doped fibre amplifier ('EDFA') in accordance with the invention will now be described in detail, by way of example, with reference to the drawings, in which:

FIG. 5 shows schematically a first EDFA in accordance with the invention;

FIG. 6 shows an alternative form of EDFA in accordance with the invention; and

DETAILED DESCRIPTION OF PREFERRED EMBODIMENTS

Figure 1:
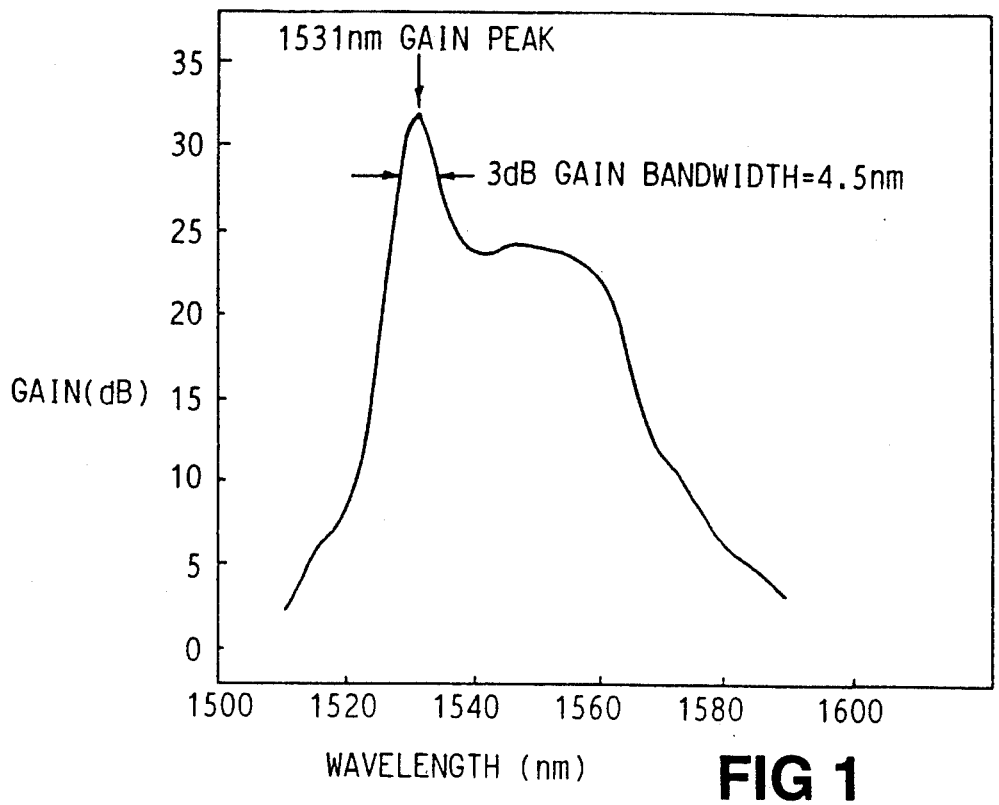
FIG. 1 shows the spectral gain of a conventional EDFA.

The wideband optical-fibre amplifier described below consists of at least two sections of optical fibre which contain approportion of rare-earth dopant ions (e.g. $Er^{3+}$) within the core, and band-rejection filters operating at the peak wavelength of the gain spectrum inserted between each section of fibre. When pumped at a suitable wavelength (e.g. 980 nm), each section of optical fibre is capable of optical amplification by means of stimulated emission from excited rare-earth ions, with gain spectrum as shown in FIG. 1.

Figure 2:
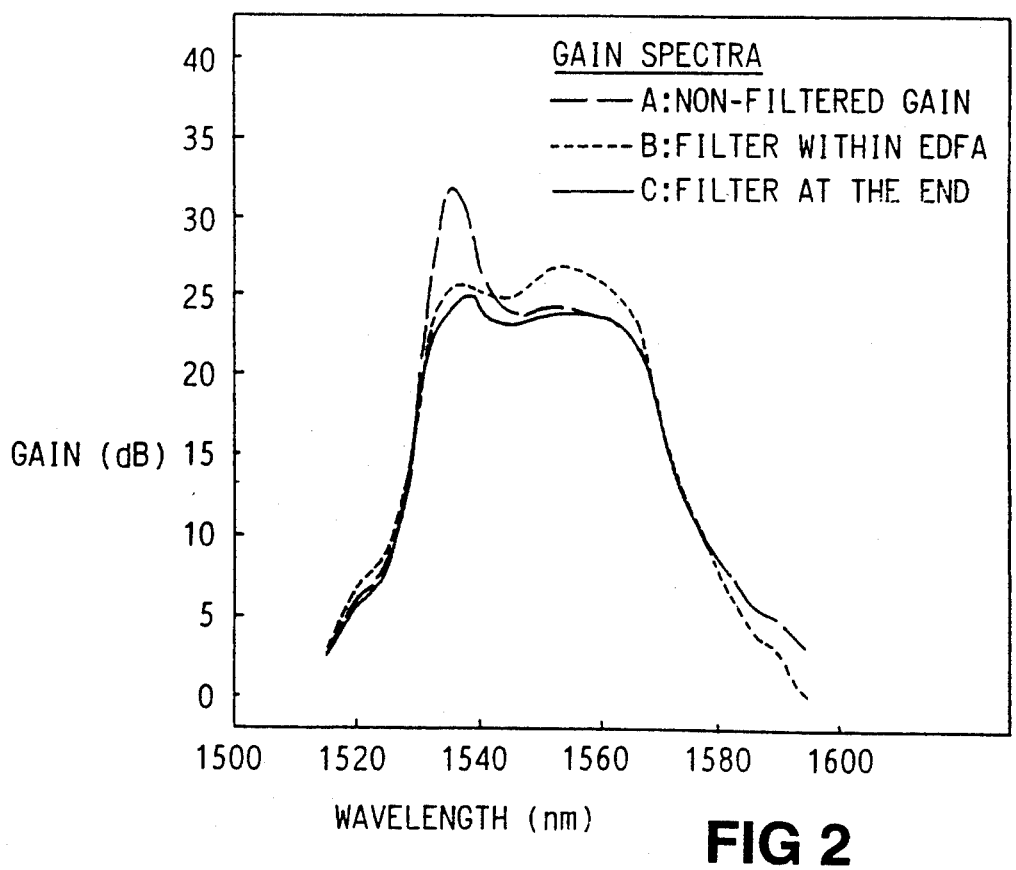
FIG. 2 shows the gain spectra of the EDFA of FIG. 1 utilising a filter within the EDFA (Curve B) and a filter at the end of the EDFA (Curve C)

The attenuation of the band rejection filter is chosen so that it exactly cancels the larger gain at the peak wavelength and thus modifies the overall gain spectrum to a more uniform shape as shown in FIG. 2 (Curve B). This does not necessarily mean that the attenuation of the filter should be equal to the difference in the spectral gain of the fibre amplifier between the peak and plateau wavelengths, as would be required for a filter placed at the amplifier output. The filter incorporated within the fibre amplifier changes the spectral-gain profile in a different way owing to its suppression of the ASE power. This will be discussed further below. The number of sections of fibre and their lengths are chosen to ensure that the sections are not saturated by the ASE (or injected signal if this is present) at the peak wavelength of the gain spectrum.

If the filter spectral responses are chosen correctly, this configuration modifies the gain and saturation characteristics of the amplifier to be uniform over the whole range of the gain spectrum of the particular rare-earth ion used. As noted above, such an optical amplifier is well-suited for wavelength-division-multiplexing or optical-frequency division multiplexing, as it provides equal amplification for all signals within the amplifier bandwidth.

Figure 3:
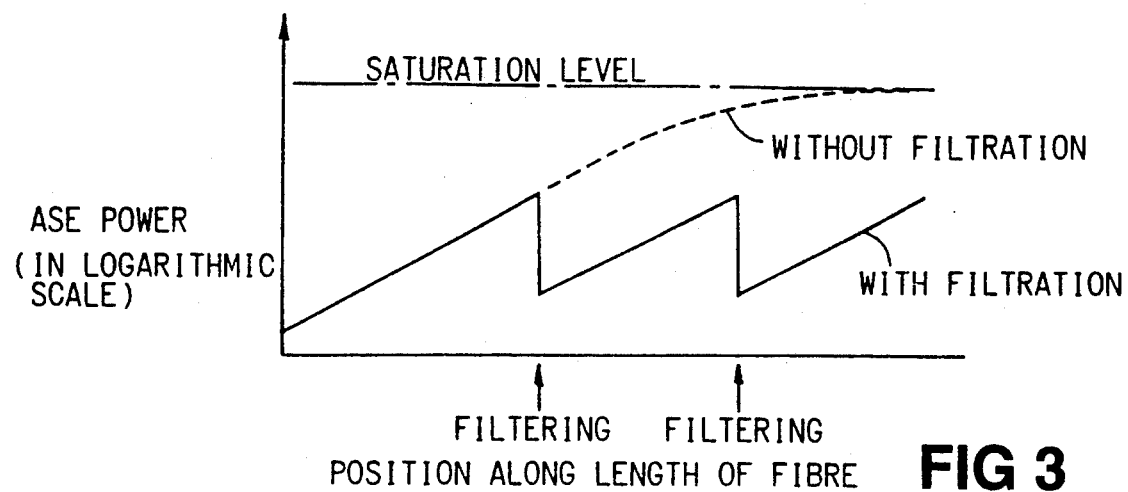
FIG. 3 shows the build-up of ASE along the length of an EDFA.

As indicated above, the ASE is very nearly proportional to the amplifier gain and therefore the ASE spectrum is very similar to the gain spectrum, having a preponderance of power at the peak. Filtering at the peak wavelength of the gain spectrum with a filter placed within the amplifier reduces most of the spectral power of the ASE in an efficient manner and delays the onset of ASE-induced saturation, resulting in good pump efficiency. This is because the exponential build-up of the ASE at this wavelength along the length of the fibre is suppressed at the end of each fibre section and thus the ASE power is maintained at a low level (as shown schematically in FIG. 3), rather than growing to a high level.

A substantial amount of the population of rare-earth ions in the excited state is therefore saved from stimulated emission caused by ASE and reserved for the amplification of signal. This results in an increase in gain over the whole range of the gain band within the section of fibre after the filter. The filter loss spectrum should be designed to flatten the spectral gain taking account of the gain obtained in exchange for the ASE power. Thus the filter within the fibre amplifier improves the pumping efficiency and results in increased gain availability at wavelengths outside the rejection band of the filter. This effect also contributes to the flattening of the spectral gain and is illustrated in FIG. 2 (Curves A and B), which compare to the spectral gain in an EDFA with and without filtering. It is to be noted that placing the filter at the output of the amplifier does not give the advantage of increased gain outside of the filter stop-band, since the filter has no effect on the build up of ASE within the amplifier. Furthermore, since the effect of the filter at the output is purely passive, the output power within the filter band is simply reduced by the filter attenuation. This causes an accompanying reduction of the amplifier saturation power within this band.

Figure 4:
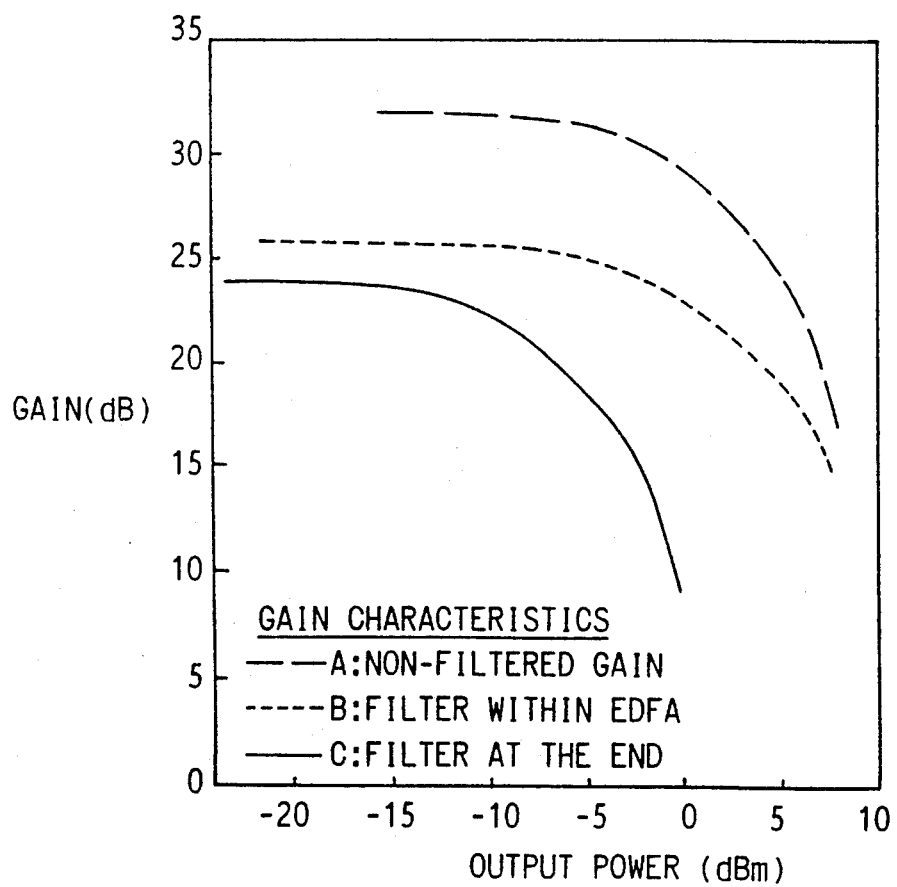
FIG. 4 shows the gain and saturation characteristics of an EDFA at 1531 nm.

This last point is illustrated by FIG. 4 where the amplifier gain characteristics at 1531 nm with and without internal filtering are given (Curves A and B). From the figure it can be seen that 3 dB gain compression occurs, for output powers around 1 mW in both cases, thus defining an output saturation power of 0 dBm.

By contrast, taking the calculated example of an optical notch filter with a Lorentzian spectrum applied at the output of the same EDFA, it can be seen that to obtain a 3 dB-bandwidth of $\simeq 30$ nm, the filter attenuation should be 8 dB at 1531 nm, with a 3 dB-bandwidth of 4 nm. The small-signal gain spectrum for such a system is given in FIG. 2 (Curve C). As expected, a smooth gain spectrum is obtained, but with no increase in gain at longer wavelengths. However, the gain saturation characteristics at 1531 nm are markedly different, as shown in FIG. 4 (Curve C). A 3 dB gain-compression now occurs for output powers around only $-8$ dB owing to the attenuation of the filter (i.e. 8 dB) at the output of the EDFA.

There are numerous possible implementations of the optical filter. One such is wavelength-selective resonant coupling from the propagating core mode of the fibre to a cladding leaky mode. Generally, it is possible to induce strong coupling between orthogonal modes of a waveguide by means of a periodic perturbation along the propagation axis of the waveguide, R. C. Youngquist et al: "All-fibre components using periodic coupling", IEE Proceedings, Vol. 132, Pt. J, No. 5, P.277, 1985. The resonant condition is as follows:

$$\beta - \beta' = 2\pi/L$$

where L is the period of the perturbation, and $\beta$ and $\beta'$ are the propagation constants of the two modes which couple to each other.

This resonant condition is satisfied only at finite numbers of discrete wavelengths owing to the dispersive property of the modes. To implement a notch filter using this phenomenon, the propagating core mode can be coupled to one of the cladding modes. As cladding modes are leaky in the case of a fibre coated with a high-index polymer, the portion of power which coupled to the cladding mode is eventually lost in the coating. Thus an optical filter is formed at a resonant wavelength which can be selected by changing the period of the applied perturbation. The attenuation at the filter stop-band can be adjusted by changing the degree of perturbation. The advantage of this type of optical filter is that it does not require insertion of any optical components between the sections of rare-earth doped fibre which may cause excess loss or reflections at both signal and pumping wavelengths.

It should be understood that any of the well-known optical filtering techniques could be used to implement the invention. Moreover, the filter could be at a discrete point within the length of the amplifier, or could be applied continuously along its length.

One possible implementation of the invention is shown in FIG. 5.

A rare-earth-doped optical fibre 10 was chosen to be single-mode at the amplification wavelength which is 1.55 $\mu$m in the case of the EDFA. The fibre 10 used had an erbium concentration of 25 ppm in the core, a numerical aperture of 0.14 and a cutoff wavelength of 945 nm. The core composition was 4 mol % $Al_2O_3$ — 96 mol % $SiO_2$. In this case the fibre 10 was continuous, and a single optical filter 12 was applied at approximately the centre by periodically perturbing the fibre. The filter 12 consisted of a grating 14 with a period of 775 $\mu$m which satisfied for this particular fibre the resonant condition for coupling between core and cladding modes at the peak wavelengths of the gain spectrum. The fibre 10 was sandwiched between the grating 14 and a flat plate 16, and a load 18 applied. This mechanism perturbs the fibre 10 with a periodic deformation matching that of the grating 14 and achieves an effective core-cladding coupling.

There are three important parameters which must be adjusted to achieve optimum gain-flattening. These are the resonant wavelength, the attentuation and the bandwidth of the filter 12. The required values can be obtained by adjusting the period of the grating 14, the magnitude of the load 18 (i.e. the deformation of the fibre) and the total length of the grating 14, respectively.

Pump light from a light source 20 and a signal light 22 were coupled into the fibre 10 through a dichroic fibre-coupler 24 with a large coupling ratio at the pumping wavelength and a small one at the signal wavelength. The fibre 10 is spliced to one coupler output 26, while the other coupler output 28 has a non-reflective termination 28. The results obtained are shown in FIG. 2 (Curve A and B), which compare the spectral gain of the EDFA for the same pump power both before and after filtering. The peak of the gain is substantially reduced and this gain becomes available within the plateau, thus increasing the gain in this region. The filtered spectrum is substantially flat over a 30 nm bandwidth.

Another possible implementation of the invention is shown in FIG. 6. Those parts of EDFA shown in FIG. 6 which are the same as that of FIG. 5 have been given the same reference numerals. The fibre 10 is separated into two sections 10a and 10b by a multilayer filtering apparatus 30 consisting of two coupling lenses 32, 34 and a dielectric interference filter 36. This filter 36 is designed to cancel out the larger gain of the fibre 10 around the peak wavelength and to be transparent elsewhere. A thin filter chip could also be embedded into the fibre without coupling lenses as described in H. Yanagawa et al: "Low loss in-line single-mode filter", Proc. Conference on Optical Fibre Communications (OFC '90), San Francisco, Paper TUG3, February 1990. The rest of the configuration is the same as the implementation described above.

It should be understood that there are several further implementations of the basic idea within the scope of the invention, some of which are outlined as follows.

Any of the well-known techniques for producing an optical band-stop filter can be incorporated into the fibre at appropriate points along its length. These can include, for example, thin coloured-glass filters, Fabry-Perot filters and various other forms of resonant filter (e.g. Bragg filters) applied to the fibre. The requirement for a filter is that it should introduce minimal loss at wavelengths outside the band-stop region, as well as minimal reflection. Both these factors can adversely affect amplifier performance. Thus any filter-chip embedded within the fibre should be sufficiently thin to cause minimal loss and discrete components inserted within a gap in the fibre should be angled to prevent reflections. The filter can be discrete, distributed, or indeed continuous along part of or the entire length of the amplifier. It could also be incorporated into the core of the amplifier by adding a dopant which absorbs at the peak of the gain spectrum, but is lossless elsewhere.

It should also be understood that whereas the discussion above refers to the erbium-doped fibre amplifier, the concept of gain-shaping is applicable to any optical amplifier, including those constructed using other rare-earths such as neodymium.

Figure 7:
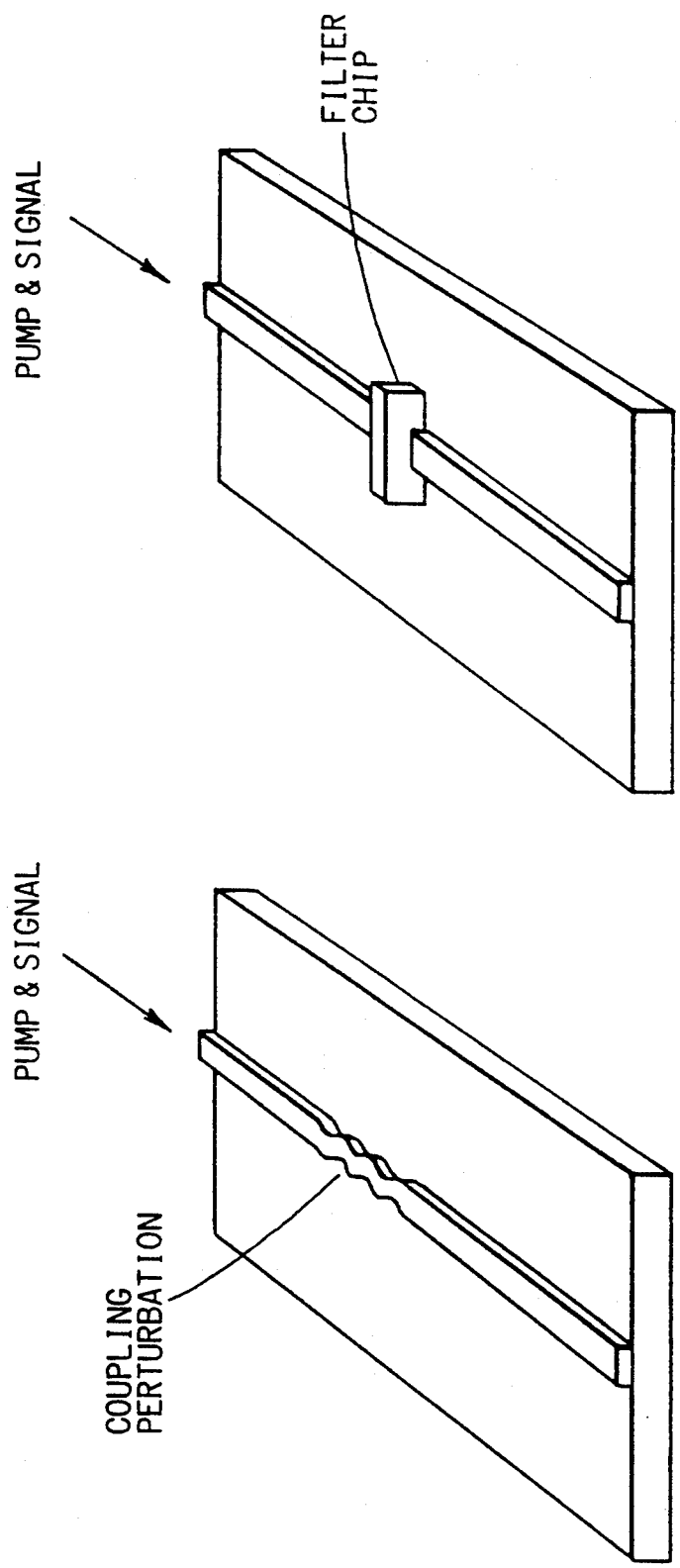
FIG. 7 illustrates planar-waveguide EDFA apparatus analogous to the fibre-based amplifiers of FIGS. 5 and 6.

The description above largely emphasises fibre amplifiers. However, the gain-shaping concept is equally applicable to rare-earth-doped amplifiers constructed in a planar configuration. An example is given in FIG. 7 where the rare-earth-doped rib waveguide on a suitable substrate is shown. In this case the filter can be incorporated within the length of the amplifier by similar techniques to those described for optical fibres. However, additional opportunities now exist to deform the waveguide permanently by using photolithography to define a meandering section or a periodic perturbation of the guide edge and thus produce a filter. The invention also applies to buried waveguides and to those made by ion exchange. Similar filtering techniques could also be applied to semiconductor injection laser amplifiers.

It should also be understood that the technique of applying a filter within the length of the amplifier can also be used to narrow the spectral gain of the amplifier. In some applications it is an advantage to have very narrow-band amplification in order to reduce the extent of the ASE spectrum. Such filtering reduces spontaneous-spontaneous beat noise and allows the amplifier to attain the theoretical quantum-limited noise figure of 3dB even at low input signal levels, such as those experienced in pre-amplifier applications. Ideally, the amplifier should be filtered to have a spectral width equal to that of the signal-modulation bandwidth, typically a few GHz. It is advantageous to insert the required narrow-band filter (now a band-pass design) within the length of the amplifier, rather than at the output for much the same reasons as have been given here for gain-shaping. In particular, insertion within the amplifier reduces the magnitude of the total ASE at the output of the amplifier and therefore improves pump efficiency.

What we claim is:

1. An optical amplifier for amplifying signals substantially uniformly at a plurality of wavelengths throughout a predetermined wavelength band comprising:
    a length of active optical waveguide which is doped with a fluorescent substance, which has opposite ends, which is continuous between its ends, which is pumpable by light energy at a pump wavelength and which causes amplification gain of said signals with fluorescence of said substance, when said signals are applied to said waveguide, throughout a first wavelength band, the amount of amplification gain depending on the fluorescence of said substance and the amplification gain being greater at at least one wavelength within a second wavelength band within said first wavelength band and narrower than said first wavelength band; and
    at least one filter means disposed at at least one portion, less than the length of said optical waveguide, along the length of said waveguide and operative at said portion to modify the transmission characteristics of said portion and thereby to reduce amplification gain at least at said one wavelength within said second band without substantially reducing amplification gain at least at signal wavelengths above said second band whereby the amplification gain of said amplifier for said signals is substantially uniform throughout said first band and unwanted amplified spontaneous emission is reduced.

2. An optical amplifier as set forth in claim 1 wherein said filter means is an optical band rejection filter which attenuates light energy at wavelengths in said second band but said amplifier is without an optical filter which substantially attenuates light energy at wavelengths outside said second band.

3. An optical amplifier as set forth in claim 1 wherein said fluorescent substance is erbium, said one wavelength is substantially 1531 nm, said first wavelength band is from about 1529 nm to about 1560 nm and said second wavelength band is about 1529 to about 1533 nm.

4. An optical amplifier as set forth in claim 3 wherein said optical waveguide is an optical fiber with a core with a cladding therearound, said core being doped with erbium, and said fiber having a numerical aperture of about 0.14 and a cutoff wavelength of about 945 nm and being single mode at wavelengths in said first band.

5. An optical amplifier for amplifying signals substantially uniformly at a plurality of wavelengths throughout a predetermined wavelength band comprising:
    a pair of lengths of active optical waveguide which are doped with a fluorescent substance, each length of which has opposite ends, which is pumpable by light energy at a pump wavelength and which causes amplification gain of said signals with fluorescence of said substance, when said signals are applied to said waveguide, throughout a first wavelength band, the amount of amplification gain depending on the fluorescence of said substance and the amplification gain being greater at at least one wavelength within a second wavelength band within said first wavelength band and narrower than said first wavelength band; and
    filter means interconnecting one end of one of said lengths with an end of the other of said lengths to reduce amplification gain at least at said one wavelength within said second band without substantially reducing amplification gain at least at signal wavelengths above said second band whereby the amplification gain of said amplifier for said signals is substantially uniform throughout said first band and unwanted amplified spontaneous emission is reduced.

6. The invention set forth in claim 2 wherein said optial band rejection filter comprises said portion of said waveguide means;
    a grating such as to cause periodic perturbation thereof; and
    means for urging said portion of the waveguide means into contact with said grating.

7. The invention set forth in claim 6 wherein said means for urging includes a load under the action of which the portion of said waveguide means is urged into contact with said grating.

8. The invention set forth in claim 5 wherein said filter means is an optical band-rejection filter and is a dielectric interference filter.

9. The invention set forth in claim 5 wherein said filter means is an optical band-rejection filter includes a coloured glass absorption filter or a Fabry-Perot filter.

10. The invention set forth in claim 1 wherein said waveguide is a rare-earth doped optical fibre or planar waveguide.

* * * * *